May 24, 1932.  E. KOPPL  1,859,590
VALVE
Filed Jan. 24, 1927
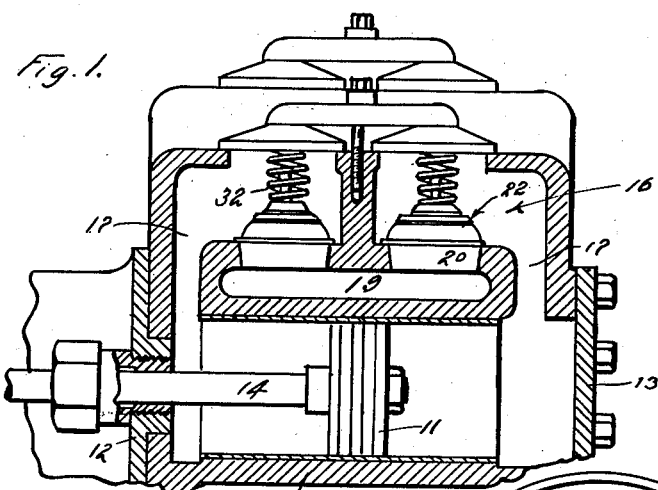
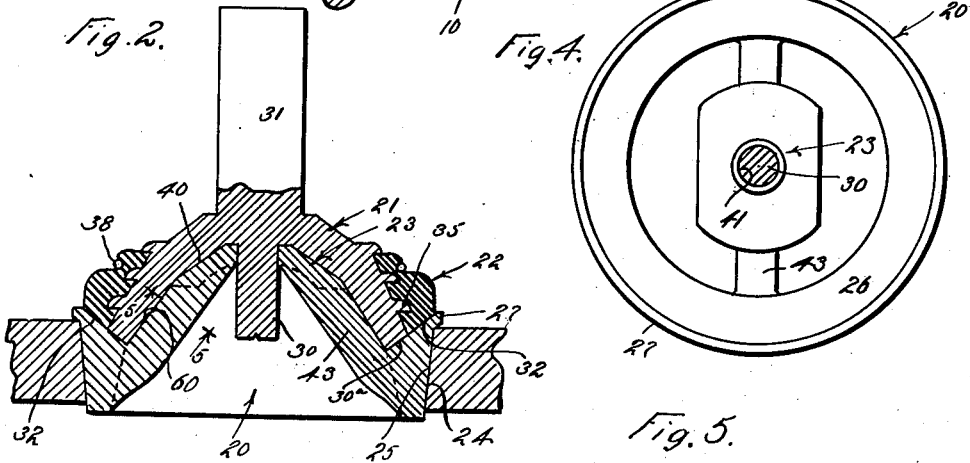
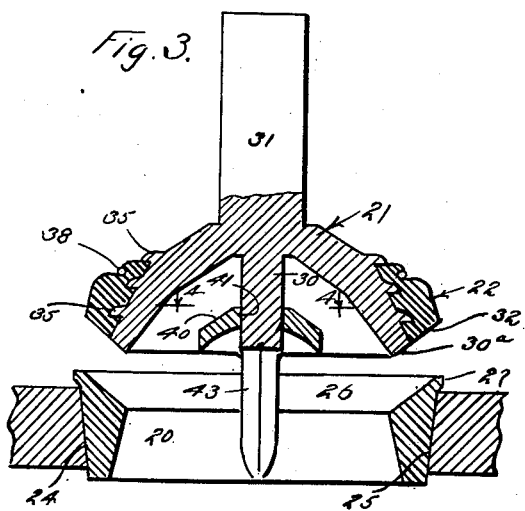
Inventor
Ernest Koppl
by *[signature]*
his Attorney Patented May 24, 1932

1,859,590

UNITED STATES PATENT OFFICE

ERNEST KOPPL, OF LONG BEACH, CALIFORNIA, ASSIGNOR, BY DIRECT AND MESNE ASSIGNMENTS, OF ONE-HALF TO HIMSELF AND ONE-HALF TO KENNETH A. WRIGHT, OF LOS ANGELES, CALIFORNIA

VALVE

Application filed January 24, 1927. Serial No. 162,989.

This invention has to do with a valve and it is a general object of the invention to provide an effective, improved and economical valve construction.

The valve provided by this invention is of the type having metal parts for carrying the load or pressure and soft or flexible parts for effecting a fluid tight connection or seal. The construction provided by my invention is useful in many situations requiring an effective, durable valve, and is particularly useful in slush pumps, or the like, such as are employed to handle dirty or gritty fluids. In view of the fact that the invention is particularly suited for use in slush pumps, I have in this application disclosed the invention as applied to a typical slush pump and have disclosed a form and construction of the invention suitable for slush pumps, it being understood, however, that this disclosure is made merely for the purpose of facilitating an understanding of the principles of my invention and is not to be construed as limiting or restricting the scope or range of application of the invention.

It is a primary object of my invention to provide a valve of the general type above referred to in which the movable part or valve proper is formed of only two parts, one a metal body and the other a ring of packing or sealing material.

Another object of my invention is to provide an effective, simple and improved manner of mounting a packing or sealing ring on a valve body.

A further object of my invention is to provide an effective and improved manner of guiding a valve part with reference to its seat.

Another object of the invention is to provide an improved formation and relationing of valve part and seat whereby effective and efficient operation is obtained.

It is another object of my invention to provide a valve part of extremely simple and inexpensive construction.

An important object of the invention is to provide a valve with large, effective wearing surfaces which result in long life to the valve.

The various objects and features of the invention will be understood from the following detailed description of a typical form and application of the invention, throughout which description reference is had to the accompanying drawings, in which:

Fig. 1 is a fragmentary sectional view of a slush pump showing the intake valves of the pump, which valves embody the construction provided by this invention;

Fig. 2 is an enlarged detailed, sectional view through one of the valves showing it closed;

Fig. 3 is a view similar to Fig. 2, showing the valve open;

Fig. 4 is a plan view taken substantially as indicated by line 4—4 on Fig. 3; and Fig. 5 is an enlarged, detailed, sectional view taken as indicated by line 5—5 on Fig. 2.

To facilitate an understanding of my invention, I have shown it applied to a typical slush pump comprising, generally, a cylinder 10, a piston 11 operable in the cylinder, heads 12 and 13 closing the ends of the cylinder, a piston rod 14 extending into the cylinder through one of the heads and carrying the piston, a valve chest 16 connected with the head ends of the cylinder by suitable ports 17, valves in the chest, and various other parts usual to mechanisms of this character.

In the drawings, I have shown in detail the intake valves of the pump which are the valves provided to control the flow of fluid from the intake chamber 19 of the valve chest to the ports 17 connected with the heads of the cylinder.

The valve construction provided by my invention includes, generally, a seat 20, a valve body 21, a sealing ring 22, and a guide 23 for the body.

The seat 20, in accordance with the construction usually followed in slush pumps, is in the form of a ring having its exterior 24 tapered to fit an opening 25 formed in the pump. In accordance with my present invention, the seat ring 20 is provided at its upper side or end with a beveled or inclined face 26, adapted to receive both the body 21 and the sealing ring 22. In practice, I prefer to pitch or incline the face 26 a substantial amount to minimize the tendency for solid particles of foreign matter to accumulate on it. In practice, I provide an outwardly extending flange 27 on the upper end of the seat ring to prevent the ring being forced too far into the opening 25.

In accordance with the preferred form of my invention, the body 21 is in the form of a concavo-convex disc and is provided at its lower or concave side with a downwardly extending central projection 30, and at its upper or convex side with an upwardly extending central projection or stem 31. The projection 30 extends downwardly to a point substantially opposite or in line with the edge portion of the body 21. The stem 31 extends upwardly from the body and is adapted to extend into an operating spring 32 so that it holds the spring in proper position with reference to the body 21. The body 21 is formed at its periphery with a beveled or inclined face 30ª to fit the face 26 of the seat ring. The face 26 of the seat is wider than the face 30ª of the valve body so that a portion, preferably the outer portion, of the face 26 is left to receive the sealing ring 22.

The sealing ring 22 is mounted on the convex side of the body 21 adjacent the periphery of the body and is formed with an inclined or beveled face 32 which seats on or co-operates with the face 26 of the seat ring. In the particular construction shown in the drawings, the face 32 of the sealing ring adjoins and forms a continuation of the face 30ª of the body 21. The sealing ring 22 is preferably formed of rubber or other suitable material so that it will provide an effective fluid-tight connection with the face 26 of the seat. In accordance with my invention, the sealing ring is retained or mounted on the body 21 by means of one or more flanges 35 provided on the convex side of the body to extend or project outwardly or radially into suitable recesses provided in the ring. In the drawings, I have shown the body provided with three flanges and I have shown the flanges shaped so that they will allow the ring to be readily expanded over them from the upper end of the body but will effectively hold the ring in place after it has reached its proper position on the body. In practice, I may provide a band 38 of wire, or the like, around the sealing ring to tie it tightly on the body 21 to serve as a retaining means for the ring in place of, or in addition to the flanges 35.

The guide 23 is located within or at the under side of the body 21 and is supported from the seat ring 20. The upper side 40 of the guide is shaped to conform to the under or inner side of the body 21 and forms a seat or rest for the body when it is in closed position. The guide has a central opening 41, which slidably carries the projection 30. The projection in extending through the opening in the guide holds the body 21 in proper alignment with the seat ring.

In the preferred form of my invention, the guide 23 is supported from the seat ring through ribs 43 in the manner clearly illustrated throughout the drawings. In the construction shown, there are two supporting ribs 43 for the guide arranged diametrically opposite each other and extending upwardly and inwardly from the seat ring to support the guide 23 a substantial distance above the seat ring. The guide is supported above the seat ring so that it is out of the path of fluid passing through the valve and therefore does not in any way interfere with the flow of fluid through the valve. In this connection, it is to be pointed out that the seat ring 20 is preferably mounted in the opening 25 so that one of the ribs 43 is in the center of flow through the valve. The ribs are preferably designed so that their outer or upper faces 60 fit and form supports for the body 21 while their inner or under sides are shaped to part a stream of fluid with very little resistance. By locating the seat ring so that one of the ribs 43 is in the center of the main line of flow through the valve, only one of the ribs has any material influence on the flow of fluid through the valve. In the preferred form of the invention, the guide 23, supporting ribs 43, and seat ring 20 are formed as an integral unit, for instance, as a single casting, thus materially simplifying the construction of the valve.

From the foregoing description, it will be obvious how the valve operates. The spring normally holds the body 21 down with its face 30ª in seated engagement with the face 26 of the seat ring 20. When the body is in this position, the sealing ring 22 carried on the body has its face 32 in engagement with the face 26 of the seat ring so that fluid pressure coming on the valve holds the sealing ring tight on the face 26 and thus effects a fluid-tight seal between the valve and seat. When the valve is closed, the body 21 seats on the face 26, guide 23 and ribs 43, so that pressure coming on the body is distributed over these parts and does not cause excessive pressure or wear to come on any one part. When the valve is opened to a position such as is shown in Fig. 3, due to the fluid pressure at the under side of the body 21, the space or opening between the face 26 of the seat ring and the faces 30ª and 32 of the valve body and sealing ring, respectively, allows free passage of fluid through the valve. Particular attention is called to the fact that the guide 23 and projection 30 are out of the path of flow of fluid through the valve and that the one rib 43, arranged in the line of flow, is the only part interfering with the passage of fluid through the valve.

I will again call attention to the fact that my invention provides a particularly simple, inexpensive construction and at the same time provides a valve which is effective and durable in operation. The valve body 21 with its projection 30 and stem 31 is a very simple part to manufacture, and likewise, the seat ring 20 with the guide 23 and ribs 43 is a comparatively simple, inexpensive part. I will call attention to the fact that my construction eliminates entirely the necessity of screw threads, bolts, or other like parts. Further, it is to be noted that the body 21 is shaped to effectively carry high pressures. The shape of the body 21, that is, its concavo-convex formation, permits of its being made comparatively light and thus saves in material and in the weight of the moving part.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. A slush pump valve including, a seat ring, a movable body in the form of a concavo-convex disc, a guide for the body, and ribs supporting the guide from the ring at a point above the ring, the upper parts of the guide and ribs engaging the lower side of the body when the body is in seated engagement with the ring.

2. A slush pump valve including, a seat ring, a movable body in the form of a concavo-convex disc, a sealing ring on the peripheral portion of the disc to engage the seat ring, a guide for the body, and ribs supporting the guide from the ring at a point above the ring and at the under side of the body, the upper parts of the guide and ribs engaging the lower side of the body when the body is seated engagement with the ring.

3. A slush pump valve including, a seat ring, a movable body in the form of a concavo-convex disc, a guide for the body, and diametrically opposite ribs supporting the guide from the ring at a point above the ring and under the body, the upper parts of the guide and ribs engaging the under side of the body when the body is in seated engagement with the ring.

4. A slush pump valve including, a seat ring, a movable body in the form of a concavo-convex disc, and guide means formed integral with and extending upwardly through said ring for guiding said body, the upper part of said guide means engaging the lower part of said body when said body is in seated engagement with said ring.

5. In a slush pump valve, the combination of a ring having a seating surface, a movable body adapted to seat on said seating surface, a sealing ring on the peripheral portion of said body adapted to engage said ring seating surface beyond a seating portion of said body; and a guide integral with said ring and extending upwardly therethrough, said guide guiding said body and engaging the latter when in engagement with said seating surface.

6. A combination as claimed in claim 5 in which a flange is provided on said body and said sealing ring is expanded over said flange.

7. A combination as claimed in claim 5 in which a flange is formed on the upper side of said movable body and said sealing ring is expanded over said flange to engage under the flange so as to be held at the peripheral portion of the body and wherein a band is passed around said sealing ring serving as an auxiliary retaining means.

In witness that I claim the foregoing I have hereunto subscribed my name this 18th day of January, 1927.

ERNEST KOPPL.